3,344,121
ELASTIC THERMOPLASTIC POLYESTERURE-
THANES PREPARED FROM (A) A POLY-
ESTER, (B) AN ALIPHATIC DIISOCYANATE,
(C) A DIOL, AND OPTIONALLY (D) A TRIOL
IN A CHLORINATED AROMATIC SOLVENT
Jean Auguste Phelisse, Michel Marie Roland Salmon, and Jean Fleury Marius Varagnat, Lyon, France, assignors to Rhone-Poulenc S.A., Paris, France, a corporation of France
No Drawing. Filed May 6, 1964, Ser. No. 365,523
Claims priority, application France, May 7, 1963, 933,942, Patent 1,368,153
8 Claims. (Cl. 260—75)

The present invention relates to new elastic thermoplastic polyester urethanes and to their production.

It is known to make elastomeric polyester urethanes and polyether urethanes by treating a polyester having terminal hydroxyl groups or a polyether with two molecules of an aromatic diisocyanate to give a prepolymer having terminal isocyanate groups, and then to "chain-extend" the relatively short chains of the resulting macrodiisocyanate by treating it in solution with a difunctional reagent which reacts with the isocyanate group, e.g. water, a diol, hydrazine or a diamine. The polymer solutions so obtained are then spun, either by the dry or evaporative process or by the wet process in which the solution is coagulated in a non-solvent. It is also possible to effect the polycondensation or chain-extension with the difunctional reagent after spinning, the solution of the macrodiisocyanate being spun into a coagulation bath which contains the reagent, particularly a diamine.

These methods of spinning solutions have known disadvantages (e.g. the need to recover solvents), which are aggravated by the extremely cohesive nature of the fibres, which necessitates special measures, such as coating with talcum or like material (Rinke, Chimia, vol. 16, page 102 (1962)).

Another process for the preparation of elastic fibres consists in condensing a diisocyanate with a mixture of a polyether and a diol containing a double bond in a side chain; the polyurethane obtained is then mixed with sulphur and one or more accelerators and made plastic by mixing with a relatively volatile solvent, and the very viscous mass so obtained is extruded through spinnerets. The yarns thus obtained must, however, be vulcanised by heating for some time to 120° to 140° C. This process is therefore also complicated.

It is known from French Patent No. 1,209,717 to cause simultaneous reaction between a diphenylmethane diisocyanate and a mixture of a glycol having 4–10 carbon atoms and a polyester of molecular weight 600 to 1200, prepared by polycondensation of an aliphatic dibasic acid having 4–10 carbon atoms with a diol having 4–10 carbon atoms. The quantity of isocyanate used is equivalent to the number of hydroxyl groups in the polyester and in the diol. The temperature is then held for several hours at 130°–140° C., and then the elastomer which is obtained is ground in a rubber mill in order to bring it into a form which can be used. The elastomers obtained can be worked under heat in an extruder, an injection-moulding press or a calendar.

The patent states that when the aromatic diisocyanate is replaced by an aliphatic diisocyanate, particularly hexamethylene diisocyanate, a low polymer is obtained which resembles chewing gum. Now it is known (Rinke, loc. cit., page 105) that the polyester urethanes which are based on aromatic diisocyanates have the disadvantage of becoming coloured under the action of light and require the incorporation of substances which absorb ultra-violet light, this being a disadvantage not possessed by the aliphatic diisocyanates.

It has also been proposed to prepare elastic yarns by spinning molten polyester urethanes (French Patent No. 1,328,121). A polyester with a molecular weight lower than 1400 is condensed with a suitable quantity of a diisocyanate, whereby it remains in the molten state, and then, in a second step, there are added a glycol and further diisocyanate in an excess over the quantity equivalent to the hydroxyl groups present. The polymer obtained is melt spun, and then has to be vulcanised by heating above 100° C. for several hours.

A commercial spinnable polyester urethane referred to by Rinke (loc. cit. and Revue des Produits Chimiques, vol. 65, No. 1298, page 323 (1962)), prepared by the action of a diisocyanate on a mixture of polyester and glycol, likewise contains an excess of diisocyanate with respect to the hydroxyl groups present and has to be thermoset by heating for 72 hours at 110° C. if it is to have the optimum physical properties.

Finally, it is proposed in French Patent No. 1,207,549 to condense diisocyanates with a mixture of a polyester containing 2 or 3 hydroxyl groups, an aliphatic diol in a proportion of 0 to 1 hydroxyl equivalent per polyester hydroxyl, and a triol in a proportion of 0 to 6 hydroxyl equivalents, the isocyanate groups being added in a proportion of 1.2 to 2.0 groups (thus in excess) for each hydroxyl group which is present. The polyester urethanes obtained in this way serve only for the preparation of coatings which dry in air, and it is not suggested that they have elastic or thermoplastic properties.

It has now been found that it is possible to obtain polyester urethanes which can be melted and spun, and which are stable in the molten state, which do not require any thermal after-treatment after having been shaped and which do not yellow under the action of light, by a very simple process carried out in a single step.

This process consists in condensing, at a temperature above 100° C. in a chlorinated aromatic solvent, inert with respect to isocyanate groups, of boiling point between 120° and 200° C., a mixture of:

(a) 1 molecular proportion of at least one polyester having terminal hydroxyl groups and a molecular weight of 1200 to 5000, obtained by condensation of at least one aliphatic dibasic acid having 4 to 12 carbon atoms with at least one diol having 2 to 10 carbon atoms;

(b) 2 to 4, and preferably 3, molecular proportions of at least one diol in which the hydroxyl groups are primary and which comprises more than 3 carbon atoms; and (c) 0–0.5 molecular proportion of at least one triol in which the hydroxyl groups are primary and/or secondary, and which is soluble at elevated temperatures in the remainder of the reaction mixture, with (d) an aliphatic diisocyanate in a quantity such that the number of isocyanate groups is equivalent to the number of hydroxyl groups present in the mixture $$(a)+(b)+(c)$$

The polyesters which can be used as component (a) are prepared from saturated aliphatic dibasic acids having 4 to 12 carbon atoms, i.e. succinic and dodecanedioic acids and usually adipic acid, with diols having 2 to 10 carbon atoms, in which the chain may be interrupted by heteroatoms, such as oxygen and sulphur. The diol is preferably a diprimary diol. Ethylene glycol is suitable, as well as propane-1,3-diol, butane-1,4-diol, dimethyl-2,2-propane-1,3-diol and hexane-1,6-diol. It is also possible to use primary-secondary and disecondary diols which are miscible with diprimary diols, such as propane 1,2-diol, butane-1,3-diol and butane-2,3-diol. As diols containing heteroatoms, there may be mentioned condensation products of ethylene glycol or propylene glycol, such as diethylene and triethylene glycols and dipropylene and tripropylene glycols.

The acid index of these polyesters should preferably not exceed 5, and the hydroxyl index corresponds to a mean molecular weight of 1200 to 5000.

The glycols which can be used as component (b) can be saturated cycloaliphatic or aliphatic glycols or aromatic glycols. As typical of the first category, there may be mentioned butane-1,4-diol, hexane-1,6-diol and octane-1,8-diol. The diol chain may be interrupted by heteroatoms such as oxygen or sulphur, as in diethylene and triethylene glycols and thiodiglycol. The second category is represented by the bis-(hydroxymethyl)-1,3- and -1,4-cyclohexanes, and the third by the bis-(hydroxymethyl)-1,3- and -1,4-benzenes. Diols with 2 or 3 carbon atoms are not suitable, because they yield polyester urethanes which are decomposed at the melting temperature.

In the case of the bis-(hydroxymethyl)cyclohexanes and butane-1,4-diol, the preferred prooprtions are 3 molecules of diol to 1 molecule of polyester. In the case of the diols having aliphatic chains with more than 4 carbon atoms or aromatic diols, the molecular ratio between diol and polyester can differ from 3. It is possible by systematic tests to establish the optimum proportions.

The triol which can be used as component (c) may have primary and/or secondary hydroxyl groups. The carbinol groups can be attached to the same carbon atom (as in trimethylolethane and trimethylolpropane) or to different carbon atoms (as in the hexanetriols). The carbinol groups can moreover be separated by one or more heteroatoms (as in triethanolamine). Basic triols containing a nitrogen heteroatom have a catalytic effect on the reaction velocity in addition to a cross-linking effect, particularly when polyesters with an acid index approaching zero are used, that is to say, in the absence of free carboxyl groups which would cancel out the catalytic effect of the basic groups of the triols. When a triol is used in the preparation of the polyester urethane, it may be in amount up to 0.5 mol per mol of polyester, depending partly in the diol used as component (b). Proportions of triols higher than 0.5 mol are not desirable, because they generally cause gelling during the polycondensation. Mixtures of triols can be used.

The diisocyanate which can be used as component (d) can be an aliphatic diisocyanate, such as hexamethylene diisocyanate, decamethylene diisocyanate, or dodecamethylene diisocyanate. As has already been stated, the possibility of using aliphatic diisocyanates in place of the aromatic diisocyanates is a great advantage, because the polyester urethanes prepared from aromatic diisocyanates, which have always been used hitherto for making elastic fibres, become yellow under the action of light and require the incorporation of substances which absorb ultraviolet light. The aliphatic diisocyanates do not have this disadvantage.

The solvent in which the reaction is carried out is an aromatic chlorinated solvent, preferably a chlorinated hydrocarbon such as chlorobenzene or o-dichlorobenzene. Aliphatic chlorinated solvents are unsuitable. The use of a solvent is essential. The usual technique of reacting a diisocyanate with a polyester in the melt does not permit of obtaining products which can be melt spun and which have adequate serimetric properties.

The temperature of the reaction in the solvent is above 100° C. When chlorobenzene is used, the operation may, for example, be effected at its boiling point of 132° C.

In order to carry out the process of the invention, the anhydrous reagents can be dissolved in the solvent in concentration from 5 to 50%, the mixture heated, and the reaction followed by determining the proportion of isocyanate groups remaining and the melting point of the polyurethane formed, using a sample freed from solvent. When the isocyanate groups have disappeared, the melting point generally exceeds 200° C.

The duration of the reaction depends on the reagents used and on the temperature. At 130° C. the final stage is reached in approximately 2 to 12 hours. When the reaction is complete, the polycondesnate is separated from the solvent, e.g. by instantaneous evaporation in the form of a spray (spray drying), which enables the product to be directly obtained as a powder. It is also possible to precipitate the polycondensate by adding a non-solvent, e.g. cyclohexane or hexane, when the solvent is chlorobenzene. The polycondensate precipitates as a fine powder, which can be washed before or after centrifuging, and dried. The condensation process can be carried out discontinuously or continuously. The polyesters and also the diols and triols can be dried, as by azeotropic distillation in the chlorinated solvent, before addition of the diisocyanate.

The polyester urethanes prepared in the manner described are obtained in the form of white amorphous powders. On raising the temperature, they are changed progressively from the solid amorphous state to that of a very viscous liquid. The polymers can be characterised by two temperatures: the "trace point," which is the temperature at which a sample of the polymer leaves a trace when it is applied under slight pressure to the smooth surface of a heating bench, and the "melting point," which is the temperature at which a sample of polymer projected onto a Maquenne-Kofler block melts instantaneously. The trace point is a significant property for textile uses. When the trace point is too low, there is a risk of endangering the resistance of fabrics made from the polyester urethane to heat, e.g. when subjected to boiling water, steam, sterilisation, etc. The polyester urethanes of the invention have trace points from 125° to 180° C. and melting points exceeding 160° C.

The polyester urethanes made from unbranched diols are insoluble in the majority of organic solvents, even those which are generally regarded as solvents for polyesters and polyurethanes, such as methylene chloride, chloroform, trichlorethylene, cyclohexane, benzene, toluene, acetone, methyl ethyl ketone, ether, dioxane, tetrahydrofuran, pyridine, dimethylformamide and dimethylsulphoxide. This insolubility in aliphatic chlorinated solvents is an important advantage, since fabrics made from filaments obtained from the polyurethanes of the invention can be degreased with the aid of these solvents.

The new polyester urethanes can be heated in an inert atmosphere and kept at their melting temperature for considerable periods, even exceeding 24 hours, without any noticeable degradation or gelling (which would indicate thermosetting). It is thus possible for the technique of melt spinning to be used quite safely for the formation of fibres.

For the spinning operation, the powder is preferably first converted into granules, which are easier to manipulate, as by pressing, in order to form cylindrical sections with a diameter of a few millimetres, which are then cooled and cut up.

These granules are then melted and spun in known manner; for instance they may be melted in a spinning pot in an inert atmosphere and extruded through a spinneret having one or more holes by gas pressure or a gear pump.

The cooled filaments, which do not cohere, are generally stretched to a suitable degree.

In order to improve the appearance of the fibres, the polymer may be delustred prior to spinning by adding loading agents, for example titanium dioxide.

Besides their use in spinning, the new polyester urethanes can serve for the production of a large number of other articles. They can be formed into sections of any profile, ribbons, plates, and joints of all forms. They may be shaped by moulding, extrusion or injection.

The following examples illustrate the invention.

*Examples*

The polyester, the diol and, when used, the triol are dissolved in chlorobenzene, a small fraction of the chlorobenzene is distilled off to drive off azeotropically any trace of moisture, and then hexane-1,6-diisocyanate is added. The mixture is then heated under reflux until the isocyanate groups disappear, as determined by tests, this requiring 2 to 12 hours. When the reaction is complete, the product is cooled and cyclohexane is added with stirring until the polyester urethane is completely precipitated, after which it is filtered off, washed with cyclohexane and dried.

Table I shows the concentration by weight of the reagents in the chlorobenzene solution, the nature and the proportions of the reagents, and the trace points and melting points of the polymers which are obtained. In this table, test 9 makes use of a polyester prepared by condensation of adipic acid with a mixture of ethylene glycol and propane-1,2-diol in molecular proportions of 1.5:1. All the other tests are carried out with an ethylene glycol polyadipate.

When tests 7 and 8 are compared with test 3, it will be seen that proportions of 2 or 4 mols of diol instead of 3 mols give a polymer which either melts at a relatively low temperature or gels during the reaction. Comparison of test 10 with the others shows that the addition of a triol improves the properties of the polyester urethanes.

Yarns were prepared from the polyester urethanes of tests 1, 2, 5, 6 and 9 by melt spinning, the spinning temperature being about 20° C. below the (instantaneous) melting point. The working characteristics and also the properties of the yarns or filaments thus obtained are given in the following Table II.

The elongation at break and the breaking load were measured on samples elongated at a rate of 400% per minute. The resilience for an elongation of 30% is the ratio, evaluated as a percentage between the work supplied by the yarn in returning to its initial length after an elongation of 30% and the work expended for bringing it to this elongation, the yarn being elongated at a rate of 200% per minute.

The residual elongation after an elongation of 30% is measured 1 minute after completing the resilience cycle. $Mx$ is the load in grams per 100 deniers, necessary for causing an elongation of $x\%$.

TABLE II

| | Starting Material Test No. | | | | |
|---|---|---|---|---|---|
| | 1 | 2 | 5 | 6 | 9 |
| Draw ratio | 3 | 2.7 | 3 | 3.3 | 2.7 |
| Count in deniers | 134 | 112 | 92 | 80 | 152 |
| Elongation at break, percent | 151 | 169 | 254 | 200 | 320 |
| Breaking load, g./den | 1.99 | 1.32 | 1.13 | 1.67 | 1.10 |
| $M_{30}$ in g./100 deniers | | | 19.6 | 30 | 7.9 |
| $M_{50}$ in g./100 deniers | | | 39.1 | 62.5 | 11.8 |
| $M_{100}$ in g./100 deniers | 155.5 | 96.2 | 65.2 | 106 | 20.4 |
| Resilience for a 30% elongation in percent | | | 53 | 51 | 69 |
| Residual elongation after 30% drawing, in percent | | | 1.2 | 1.6 | 0.8 |

We claim:

1. Thermoplastic elastomeric polyester urethanes which are stable in the molten state, capable of being melt spun, and resistant to discoloration under the action of light, and which are obtained by condensation in a chlorinated aromatic solvent of (a) one molecular proportion of at least one polyester with terminal hydroxyl groups and a molecular weight of 1200 to 5000, obtained by condensation of at least one aliphatic dibasic acid having 4 to 12 carbon atoms with at least one diol having 2 to 10 carbon atoms, and (b) 2 to 4 molecular proportions of at least one diol in which the hydroxyl groups are primary and which has more than 3 carbon atoms, with (c) an aliphatic diisocyanate in amount such that the number of isocyanato groups is equivalent to the number of hydroxyl groups present in the mixture of $(a)+(b)$, and separating the polyester urethane formed from the solvent.

2. Thermoplastic elastomeric polyester urethanes according to claim 1, in which the mol ratio of (a) to (b) is 1:3.

3. Thermoplastic elastomeric polyester urethanes according to claim 2, in the form of shaped articles.

TABLE I

| Test No. | 1 | 2 | 3 | 4 | 5 | 6 | 7 | 8 | 9 | 10 |
|---|---|---|---|---|---|---|---|---|---|---|
| Polyester: | | | | | | | | | | |
| Molecular weight | 1,900 | 1,900 | 2,000 | 2,600 | 2,000 | 2,000 | 2,000 | 2,000 | 1,750 | 2,000 |
| Acid index | 2.6 | 2.6 | 0.6 | 5.6 | 0.6 | 0.6 | 0.6 | 0.6 | 1.34 | 0.6 |
| Molecules | 1 | 1 | 1 | 1 | 1 | 1 | 1 | 1 | 1 | 1 |
| Diol: | | | | | | | | | | |
| Butane-1,4-diol, mol | 3 | 3 | 3 | 3 | 3 | | 2 | 4 | 3 | 3 |
| Bis(hydroxymethyl)-1,4-Cyclohexane, mol | | | | | | 3 | | | | |
| Triol: | | | | | | | | | | |
| Tri-(hydroxymethyl)propane, mol | 0.03 | 0.101 | 0.198 | 0.108 | | | 0.198 | 0.2 | 0.096 | 0 |
| Triethanolamine, mol | | | | | 0.1 | 0.1 | | | | |
| Isocyanate: Hexane-1,6-diisocyanate, mol | 4.045 | 4.15 | 4.3 | 4.16 | 4.15 | 4.15 | 3.3 | 5.3 | 4.144 | 4.0 |
| Concentration by weight of reagents, in percent | 17 | 17 | 17 | 20 | 20 | 20 | 16.5 | 17 | 16.5 | 15 |
| Product obtained: | | | | | | | | | | |
| Trace point, ° C | 140 | 160 | 140 | 160 | 135 | 130 | 125 | | 130 | 125 |
| Melting point, ° C | 230 | 240 | 240 | 260 | 210 | 200 | 180 | gel | 240 | 165 |

4. Thermoplastic elastomeric polyester urethanes according to claim 2 in the form of textile fibres.

5. Thermoplastic elastomeric polyester urethanes according to claim 1, which are obtained by a process in which the said compounds (a) and (b) are condensed also with at most 0.5 mol of at least one triol in which the hydroxyl groups are selected from the class which consists of primary and secondary hydroxyl groups and which is soluble in a solution of the said polyester and the said diol reactants in a chlorinated aromatic solvent inert with respect to isocyanato groups.

6. Thermoplastic elastomeric polyester urethanes according to claim 5, in which the mol ratio of (a) to (b) is 1:3.

7. Thermoplastic elastomeric polyester urethanes according to claim 1 in the form of shaped articles.

8. Thermoplastic elastomeric polyester urethanes according to claim 1 in the form of textile fibres.

References Cited

UNITED STATES PATENTS

| | | | |
|---|---|---|---|
| 2,621,166 | 12/1952 | Schmidt et al. | 260—75 |
| 2,729,618 | 1/1956 | Muller et al. | 260—75 |
| 2,753,319 | 7/1956 | Brockway | 260—30.6 |
| 2,871,218 | 1/1959 | Schollenberger | 260—75 |
| 2,929,800 | 3/1960 | Hill | 260—75 |
| 3,058,955 | 10/1962 | Neumann et al. | 260—77.5 |
| 3,114,735 | 12/1963 | Pigott | 260—75 |
| 3,184,426 | 4/1960 | Thoma et al. | 260—30.8 |

DONALD E. CZAJA, *Primary Examiner.*

J. J. KLOCKO, G. W. RAUCHFUSS,
*Assistant Examiners.*